US012555051B2

United States Patent
Kanagarajan et al.

(10) Patent No.: US 12,555,051 B2
(45) Date of Patent: Feb. 17, 2026

(54) REAL-TIME ASSESSMENT OF WORKER FATIGUE USING LEARNING-BASED MODEL

(71) Applicant: Honeywell International Inc., Charlotte, NC (US)

(72) Inventors: Sivakumar Kanagarajan, Bangalore (IN); Wade Lindsey, Canton, GA (US); Gobinathan Baladhandapani, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 505 days.

(21) Appl. No.: 18/153,400

(22) Filed: Jan. 12, 2023

(65) Prior Publication Data
US 2024/0161029 A1 May 16, 2024

(30) Foreign Application Priority Data
Nov. 11, 2022 (IN) .............................. 202211064627

(51) Int. Cl.
| | |
|---|---|
| *G06Q 10/0631* | (2023.01) |
| *G06F 3/01* | (2006.01) |
| *G06V 10/774* | (2022.01) |
| *G06V 10/80* | (2022.01) |
| *G10L 15/06* | (2013.01) |
| *G10L 15/22* | (2006.01) |

(Continued)

(52) U.S. Cl.
CPC ...... *G06Q 10/063114* (2013.01); *G06F 3/011* (2013.01); *G06V 10/774* (2022.01); *G06V 10/803* (2022.01); *G10L 15/063* (2013.01); *G10L 15/22* (2013.01); *G10L 25/57* (2013.01); *G10L 25/66* (2013.01); *G10L 2015/227* (2013.01); *G10L 2015/228* (2013.01)

(58) Field of Classification Search
USPC ............ 382/100–159; 704/1–275; 706/1–62, 706/900–903
See application file for complete search history.

(56) References Cited

U.S. PATENT DOCUMENTS

| | | |
|---|---|---|
| 6,446,040 B1 | 9/2002 | Socher et al. |
| 8,949,128 B2 | 2/2015 | Meyer et al. |
| 2011/0288861 A1 | 11/2011 | Kurzweil et al. |

(Continued)

OTHER PUBLICATIONS

Matsumura Toshie; Fatigue Estimation Device; 2021 (Year: 2021).*
Chen, Shu-qian; A Voice Detection Fatigue Method Based On Deep Learning; 2022 (Year: 2022).*

*Primary Examiner* — Marcellus J Augustin
(74) *Attorney, Agent, or Firm* — ALSTON & BIRD LLP

(57) ABSTRACT

A method is disclosed for providing real-time assessment of worker fatigue using a learning-based model, the method comprising: receiving speech data from a worker in a work environment and contextual information regarding the worker and the work environment; identifying patterns in the received speech data and the contextual information that correspond to an onset of fatigue in the worker; determining a probability of an occurrence of the onset of fatigue based on the identified patterns in the received speech data and contextual information; and sending an alert and/or a report to a real-time dashboard of a display when the computed probability of an occurrence of the onset of fatigue is above a predetermined threshold.

20 Claims, 5 Drawing Sheets

(51) Int. Cl.
   *G10L 25/57*         (2013.01)
   *G10L 25/66*         (2013.01)

(56)         References Cited

U.S. PATENT DOCUMENTS

2013/0311190 A1* 11/2013 Reiner ............... G06Q 10/0639
                                                    704/270
2020/0057487 A1*  2/2020 Sicconi ................... G06F 3/011
2020/0205447 A1*  7/2020 Stavova ................. A23B 2/708
2020/0401222 A1* 12/2020 Wisbey ................. H04R 5/033
2023/0211789 A1*  7/2023 Marché ................ A61B 5/6802
                                                    340/576
2023/0329609 A1* 10/2023 Wisbey ................ A61B 5/0205

* cited by examiner

REAL-TIME ASSESSMENT OF WORKER FATIGUE USING LEARNING-BASED MODEL

CROSS-REFERENCE TO RELATED APPLICATION(S)

This application claims the benefit of priority to Indian Application No. 202211064627, filed Nov. 11, 2022, the entirety of which is incorporated by reference herein.

TECHNICAL FIELD

Various embodiments of the present disclosure relate generally to connected solutions about worker safety predictions and, more particularly, to real-time assessment of worker fatigue using a learning-based model applied to data aggregated from various sources.

BACKGROUND

Fatigue in the workplace may lead to reduced quality and lower productivity. In certain workplaces, such as industrial facilities like factories and warehouses, working conditions are such that a fatigued worker may also introduce safety concerns. For example, driving a forklift is a demanding job that can all too easily lead to operator fatigue and distraction due to the repetitive nature of the work and the pressure to meet fulfilment deadlines. Even a momentary loss of concentration by an operator caused by tiredness may introduce safety hazards that should be mitigated. Monitoring and predicting fatigue so that mitigating steps may be taken would reduce the costs and hardships to workers associated with mental and physical fatigue in the workplace and help increase safety. However, monitoring fatigue has proven difficult because there are many factors that may indicate the onset of fatigue in a worker, and the means of monitoring worker fatigue may be cumbersome and/or intrusive.

The present disclosure is directed to overcoming one or more of these above-referenced challenges.

SUMMARY OF THE DISCLOSURE

In some aspects, the techniques described herein relate to a computer-implemented method for providing real-time assessment of worker fatigue using a learning-based model, the method comprising: receiving, by a processor, speech data from a worker in a work environment and contextual information regarding the worker and the work environment; identifying, by the processor, patterns in the received speech data and the contextual information that correspond to an onset of fatigue in the worker; determining, by the processor, a probability of an occurrence of the onset of fatigue based on the identified patterns in the received speech data and contextual information; and sending, by the processor, an alert and/or a report to a real-time dashboard of a display when the computed probability of an occurrence of the onset of fatigue is above a predetermined threshold.

In some aspects, the techniques described herein relate to a computer-implemented method for providing real-time assessment of worker fatigue using a learning-based model, the method further including wherein the step of identifying patterns in the received speech data and the contextual information that correspond to the onset of fatigue in the worker comprises utilizing at least one machine learning model.

In some aspects, the techniques described herein relate to a computer-implemented method for providing real-time assessment of worker fatigue using a learning-based model, the method further including wherein the at least one machine learning model includes a fatigue learning module that is trained on speech data collected from the worker during a variety of mental and physical conditions.

In some aspects, the techniques described herein relate to a computer-implemented method for providing real-time assessment of worker fatigue using a learning-based model, the method further including wherein: the receiving step further includes receiving, by a processor, telemetry and video data from a worker in a work environment via a wearable sensor and a video capture system; the identifying step further includes identifying, by the processor, patterns in the received telemetry and video data that correspond to an onset of fatigue in the worker; and the determining step further includes determining, by the processor, a probability of an occurrence of the onset of fatigue based on the identified patterns in the received telemetry and video data.

In some aspects, the techniques described herein relate to a computer-implemented method for providing real-time assessment of worker fatigue using a learning-based model, the method further including wherein the step of identifying patterns in the received telemetry and video data that correspond to the onset of fatigue in the worker comprises utilizing at least one machine learning model.

In some aspects, the techniques described herein relate to a computer-implemented method for providing real-time assessment of worker fatigue using a learning-based model, the method further including wherein the at least one machine learning model includes a fatigue learning module that is trained on: speech data collected from the worker during a variety of mental and physical conditions; telemetry data collected from the worker during the variety of mental and physical conditions; and video data collected from the worker during the variety of mental and physical conditions.

In some aspects, the techniques described herein relate to a computer-implemented method for providing real-time assessment of worker fatigue using a learning-based model, the method further including wherein the step of sending an alert and/or a report includes sending a mitigation suggestion to the real-time dashboard of the display.

In some aspects, the techniques described herein relate to a computer system for providing real-time assessment of worker fatigue using a learning-based model, the computer system comprising: at least one memory having processor-readable instructions stored therein; and at least one processor configured to access the memory and execute the processor-readable instructions, which when executed by the processor configured the processor to perform a plurality of functions, including functions for: receiving, by a processor, speech data from a worker in a work environment and contextual information regarding the worker and the work environment; identifying, by the processor, patterns in the received speech data and the contextual information that correspond to an onset of fatigue in the worker; determining, by the processor, a probability of an occurrence of the onset of fatigue based on the identified patterns in the received speech data and contextual information; and sending, by the processor, an alert and/or a report to a real-time dashboard of a display when the computed probability of an occurrence of the onset of fatigue is above a predetermined threshold.

In some aspects, the techniques described herein relate to a system further including wherein the step of identifying patterns in the received speech data and the contextual information that correspond to the onset of fatigue in the worker comprises utilizing at least one machine learning model.

In some aspects, the techniques described herein relate to a system further including wherein the at least one machine learning model includes a fatigue learning module that is trained on speech data collected from the worker during a variety of mental and physical conditions.

In some aspects, the techniques described herein relate to a system further including wherein: the receiving step further includes receiving, by a processor, telemetry and video data from a worker in a work environment via a wearable sensor and a video capture system; the identifying step further includes identifying, by the processor, patterns in the received telemetry and video data that correspond to an onset of fatigue in the worker; and the determining step further includes determining, by the processor, a probability of an occurrence of the onset of fatigue based on the identified patterns in the received telemetry and video data.

In some aspects, the techniques described herein relate to a system further including wherein the step of identifying patterns in the received telemetry and video data that correspond to the onset of fatigue in the worker comprises utilizing at least one machine learning model.

In some aspects, the techniques described herein relate to a system further including wherein the at least one machine learning model includes a fatigue learning module that is trained on: speech data collected from the worker during a variety of mental and physical conditions; telemetry data collected from the worker during the variety of mental and physical conditions; and video data collected from the worker during the variety of mental and physical conditions.

In some aspects, the techniques described herein relate to a system further including wherein the step of sending an alert and/or a report includes sending a mitigation suggestion to the real-time dashboard of the display.

In some aspects, the techniques described herein relate non-transitory computer-readable medium containing instructions for providing real-time assessment of worker fatigue using a learning-based model, the non-transitory computer-readable medium storing instructions that, when executed by at least one processor, configure the at least one processor to perform: receiving, by a processor, speech data from a worker in a work environment and contextual information regarding the worker and the work environment; identifying, by the processor, patterns in the received speech data and the contextual information that correspond to an onset of fatigue in the worker; determining, by the processor, a probability of an occurrence of the onset of fatigue based on the identified patterns in the received speech data and contextual information; and sending, by the processor, an alert and/or a report to a real-time dashboard of a display when the computed probability of an occurrence of the onset of fatigue is above a predetermined threshold.

In some aspects, the techniques described herein relate to a non-transitory computer-readable medium further including wherein the step of identifying patterns in the received speech data and the contextual information that correspond to the onset of fatigue in the worker comprises utilizing at least one machine learning model.

In some aspects, the techniques described herein relate to a non-transitory computer-readable medium further including wherein the at least one machine learning model includes a fatigue learning module that is trained on speech data collected from the worker during a variety of mental and physical conditions.

In some aspects, the techniques described herein relate to a non-transitory computer-readable medium further including wherein: the receiving step further includes receiving, by a processor, telemetry and video data from a worker in a work environment via a wearable sensor and a video capture system; the identifying step further includes identifying, by the processor, patterns in the received telemetry and video data that correspond to an onset of fatigue in the worker; and the determining step further includes determining, by the processor, a probability of an occurrence of the onset of fatigue based on the identified patterns in the received telemetry and video data.

In some aspects, the techniques described herein relate to a non-transitory computer-readable medium further including wherein the step of identifying patterns in the received telemetry and video data that correspond to the onset of fatigue in the worker comprises utilizing at least one machine learning model.

In some aspects, the techniques described herein relate to a non-transitory computer-readable medium further including wherein the at least one machine learning model includes a fatigue learning module that is trained on: speech data collected from the worker during a variety of mental and physical conditions; telemetry data collected from the worker during the variety of mental and physical conditions; and video data collected from the worker during the variety of mental and physical conditions.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
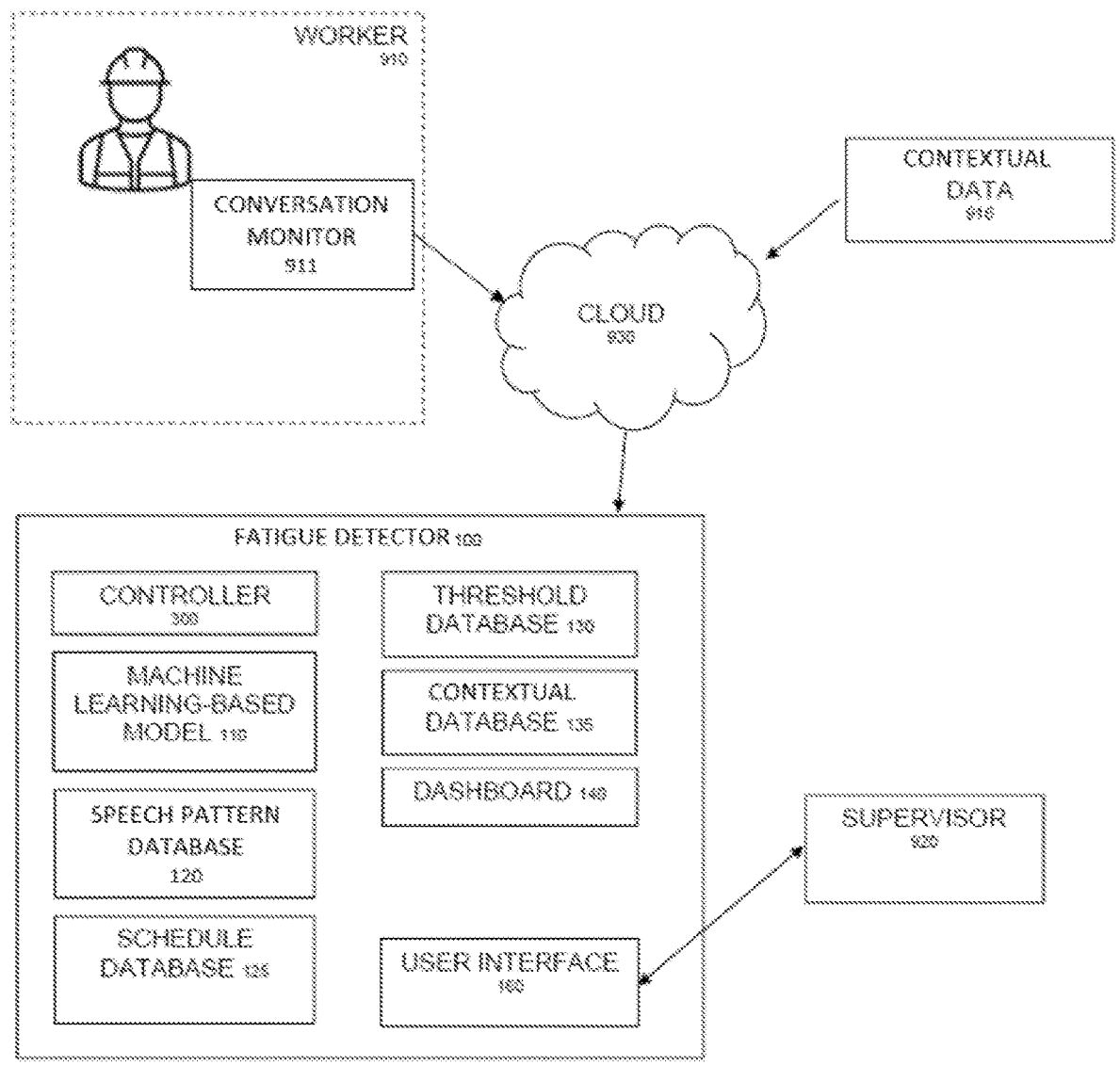
FIG. 1 depicts an exemplary system infrastructure for a fatigue detector for real time fatigue assessment of a worker, according to one or more embodiments.

Various embodiments of the present disclosure relate generally to connected solutions about worker safety predictions and, more particularly, to real-time assessment of worker fatigue using a learning-based model applied to data aggregated from various sources.

An embodiment or implementation described herein as "dynamic" is intended to reflect or indicate that the embodiment(s) is or can be marked by continuous and productive activity or change, though not necessarily constantly changing. The system and corresponding techniques facilitate communications within one or more work sites, between users (e.g., worker, teams of workers, manager, etc.), and between work sites, third parties associated therewith, and data centers. Such communications may be facilitated by edge systems and gateway systems. The edge and gateway systems may be located in work sites (i.e., on-site) as embedded or fixed systems and/or other user devices such as tablet PCs and mobile phones (e.g., devices controlled by or in communication with an operations manager, etc.). Each edge system may be coupled to a work site system from which work site operations data may be collected, and in communication with other edge systems and gateway systems. Each gateway system may be in communication with work site operation systems and edge systems of the work site in which the gateway system is resident (e.g., with the operations manager), and may also be in communication with gateway systems located in other work sites, all or some of which may provide data to the gateway system. By facilitating communication with gateway systems located in other work sites, the gateway system may enable exchange of data among edge systems installed in different work sites. Independent user computing devices, such as tablet PCs and mobile phones, may be directly coupled to and/or in communication with the edge systems and/or gateway systems, to request, filter, view, and/or analyze data.

Hardware for all or some of the edge systems and gateway systems may be installed in work sites. Therefore, software may be installed on the corresponding work site hardware. The software implemented in the edge systems and gateway systems may comprise computer-executable code for performing various data functions, including but not limited to, data request, data query, data retrieval, data transmission, and data analytics. The edge systems and gateway systems each identify source(s) of relevant data, and request that data be provided dynamically (as needed) or statically (all the time) from the identified source(s), such as from other edge systems coupled to work site systems in the work site or other work sites, gateway systems in the work site or other work sites, decentralized system(s) such as cloud computing center(s), and centralized system(s) such as dedicated server farms. The decentralized system(s) and centralized system(s) may be owned by the operators of the work sites, or by a third party such as a government or a commercial entity.

Each edge system in a work site may be coupled to a sensor of a corresponding work site system in the same work site, enabling data captured by the sensor to be provided directly to the edge system. Also, a gateway system in a work site may be coupled to one or more sensors of work site systems in the same work site, enabling data captured by the one or more sensors to be provided directly to the gateway system. In another embodiment, each edge system in a work site may be coupled to work site system of a corresponding work site system in the same work site. Also, a gateway system in a work site may be coupled to work site system machines of work site systems in the same work site. In some aspects, work site system machines may be configured to collect data from the coupled one or more sensors, perform computations and/or analysis of the collected data, store the collected and/or analyzed data in memory, and provide the collected and/or analyzed data to one or more connected edge systems and/or gateway system. In some embodiments, the work site system may not be implemented, or may not be coupled to the one or more sensors of the work site system. If the work site system machine is not implemented or not coupled to the one or more sensors, data captured by the one or more sensors may be provided directly to the one or more connected edge systems and/or gateway system.

Each work site system may be in communication with, through an edge system or not, a gateway system. Edge systems in a work site may be in direct communication with one another. For example, any data retained by one edge system may be transmitted directly to another edge system within the same work site, without a gateway system acting as an intermediary. In another embodiment, an edge system may send to or receive data from another edge system located in the same work site through a gateway system. The communication between the edge systems and the communication between the edge systems and the gateway system may be through a wired or wireless connection.

A gateway system of a work site may be in communication with gateway systems of other work sites. Through this communication path, an edge system or a gateway system of a work site may transmit data to and obtain data from edge systems or gateway systems of other work sites. The communication path between gateway systems of different work sites may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed. An edge system in a work site may communicate with another edge system in a different work site via gateway systems of the respective work sites. For example, an edge system in a work site may transmit data to one or more edge systems in other work sites via the gateway systems of the respective work sites communicating over the communication path discussed above.

Each edge system and gateway system may comprise state machines, such as processor(s) coupled to memory. Both the edge systems and the gateway systems may be configured with a common operating system to support portable, system-wide edge software implementations. In other words, each of the edge systems and the gateway systems may be equipped with standard software to facilitate inter-operability among the edge systems and the gateway systems. In the discussion below, such software will be referred to as edge software. The edge software may enable each edge system or gateway system to perform various functions listed below (non-exhaustive) to enable data analysis and data exchange among the various systems illustrated herein (e.g., edge systems, gateway systems, work site operations centers, remote systems):

Filter and analyze real-time and stored data collected from other edge systems, work site systems, gateway systems, and/or operations center(s), and generate events based on the analysis; Identify dynamic (i.e., as needed) and static (i.e., all the time) data transmission targets (e.g., edge systems within the same work site, edge systems in other work sites, operations center(s)); Transmit data over an Internet connection to the operations centers; Provide a request/response interface for other edge/gateway systems, work site borne computer systems, operations centers, and remote systems connected over wired/wireless networks or Internet to query the stored data and to dynamically select/change data filters; Use request/response interfaces provided by other edge systems, gateway systems, and operations centers connected over wired/wireless networks or Internet to obtain data and to dynamically select/change data filters; Receive events from other edge systems, gateway systems, and operations centers; and Specify and communicate generic purposes (i.e., types of data the edge/gateway system is interested in) to other edge systems, gateway systems, and operations centers.

Each edge system or gateway system may autonomously select and deliver data to one or more transmission targets, which may be other edge systems in the same work site, edge systems in other work sites, gateway system in the same work site, gateway systems in other work sites, or operations center(s). Each of the receiving edge or gateway systems (i.e., transmission targets) may be configured to filter the received data using a pre-defined filter, overriding the autonomous determination made by the edge system transmitting the data. In some embodiment, each receiving edge or gateway system may notify the other systems, in advance of the data transmission, of the types of data and/or analysis the receiving system wants to receive (i.e., generic "purposes"). Also, each edge or gateway system may maintain a list including static data transmission targets (transmission targets that always need the data) and dynamic data transmission targets (transmission targets that need the data on as-needed basis).

A gateway system of a work site may also be in communication with one or more operations centers, which may be located remotely from the work site (i.e., off-site). In some embodiments, however, the operations center(s) may be located on-site at the work site. Each of the work site systems of this disclosure may be implemented in a dedicated location, such as a server system, or may be implemented in a decentralized manner, for example, as part of a cloud system. The communication path between the gateway systems and the operations center(s) may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed.

Subject matter will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). Furthermore, the method presented in the drawings and the specification is not to be construed as limiting the order in which the individual steps may be performed. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" or "in some embodiments" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

FIG. 1 depicts an exemplary system infrastructure for a system for real time fatigue assessment of a worker, according to one or more embodiments. As shown in FIG. 1, fatigue detector 100 may monitor worker 910 using conversation monitor 911 and contextual data system 916, and provide information to one or more of worker 910 or supervisor 920. Conversation monitor 911 and contextual data system 916 may provide data to fatigue detector 100 through an edge system and cloud 930. Cloud 930 may be any local or networked system suitable for transferring data.

Conversation monitor may be one or more of a microphone, a camera with audio input, and a computer with a voice over IP application, for example, for collection of speech pattern data of worker 910 such as pitch, words per minute, pauses between words, audible yawns, or repetition of words, for example. Conversation monitor 911 may periodically or continuously collect conversation data of worker 910 performing a task in a surrounding environment, and may send the collected conversation data to cloud 930 periodically or continuously.

Contextual data system 916 may periodically or continuously collect data related to and pertinent to worker 910 performing a task in a surrounding environment, and may send the collected contextual data to cloud 930 periodically or continuously. Contextual data may include information such as, for example, a temperature of an environment of worker 910, a task that worker 910 is working on, the strenuousness of the task, the hazards associated with the worker's task or location, and/or a state of a machine that worker 910 is near. However, the disclosure is not limited thereto, and contextual data may include any information that may be relevant to assessing the health and safety of worker 910 and worksite considerations that may be affected by worker 910 successfully completing a given task or set of tasks.

Fatigue detector system 100 may include controller 300, machine learning-based model 110, speech pattern database 120, schedule database 125, threshold database 130, contextual information database 135, dashboard 140, and user interface 160.

Machine learning-based model 110 may use data from one or more of speech pattern database 120, schedule database 125, threshold database 130, or contextual database 135 to automatically generate a real time fatigue assessment of worker 910. Speech pattern database 120 may store conversation data associated with worker 910 from conversation monitor 911, and may store conversation data associated with other workers from other conversation monitors. Schedule database 125 may store schedule information associated with worker 910, and may store schedule information associated with other workers. Threshold database 130 may store threshold information associated with worker 910, and may store threshold information associated with other workers. The threshold information may include one or more fatigue thresholds. Contextual database 135 may store contextual information associated with worker 910 from contextual data system 916, and may store contextual information associated with other workers.

Dashboard 140 may provide a software interface for one or more of speech pattern database 120, schedule database 125, threshold database 130, or contextual database 135. For example, dashboard 140 may receive alerts from machine learning-based model 110 along with real time fatigue assessment of worker 910. Dashboard 140 may receive the real time fatigue assessment of worker 910 from machine learning-based model 110 and generate alerts based on the received assessment.

User interface 160 may include a touchscreen display, for example, to provide information to a user from dashboard 140 and receive information from a user to dashboard 140. For example, supervisor 920 may review alerts generated for dashboard 140 and displayed on user interface 160, or may review and/or update worker schedule information in schedule database 125 using user interface 160 to interact with schedule database 125 through dashboard 140.

Fatigue detector 100 may receive data from conversation monitor 911, and contextual data system 916, and determine a condition of worker 910 by analyzing the received data using a fatigue algorithm, such as a machine learning algorithm trained on one or more of speech pattern database 120, threshold database 130, or contextual database 135, for example.

For example, speech pattern database 120 may receive speech pattern data from conversation monitor 911. Machine learning-based model 110 may determine a potential fatigue condition from the speech pattern data when a pitch of the speech is below a threshold level, as defined in threshold database 130, for worker 910. Alternatively or in parallel, machine learning-based model 110 may determine a potential fatigue condition from the speech pattern data when a words per minute calculation of the speech is below a threshold level, as defined in threshold database 130, for worker 910. Consequently, fatigue detector 100 may provide an alert to one or more of worker 910 or supervisor 920 indicating that worker 910 may be experiencing the onset of fatigue and that there should be intervention or mitigation.

For example, worker 910 may be an operator for mining machinery, and speech pattern database 120 may include speech pattern data from conversation monitor 911 recording the conversation of worker 910. Machine learning-based model 110 may determine the fatigue condition from the data that a pitch of the operator's speech is below a threshold level, as defined in threshold database 130, for the operator. Consequently, fatigue detector 100 may provide an alert to the worker 910 and to a supervisor 920 indicating that the operator may be experiencing the onset of fatigue or may already be in a fatigue condition.

The alert may be one or more of a text message, audio alert, haptic feedback, or visual alert, for example. A visual alert may use different colors such as green, yellow, and red, for example, that correlate respectively with different levels of criticality, such as worker 910 is in a safe condition, worker 910 may be approaching an unsafe fatigue condition, and worker 910 is fatigued and needs immediate attention or relief, for example.

Figure 2:
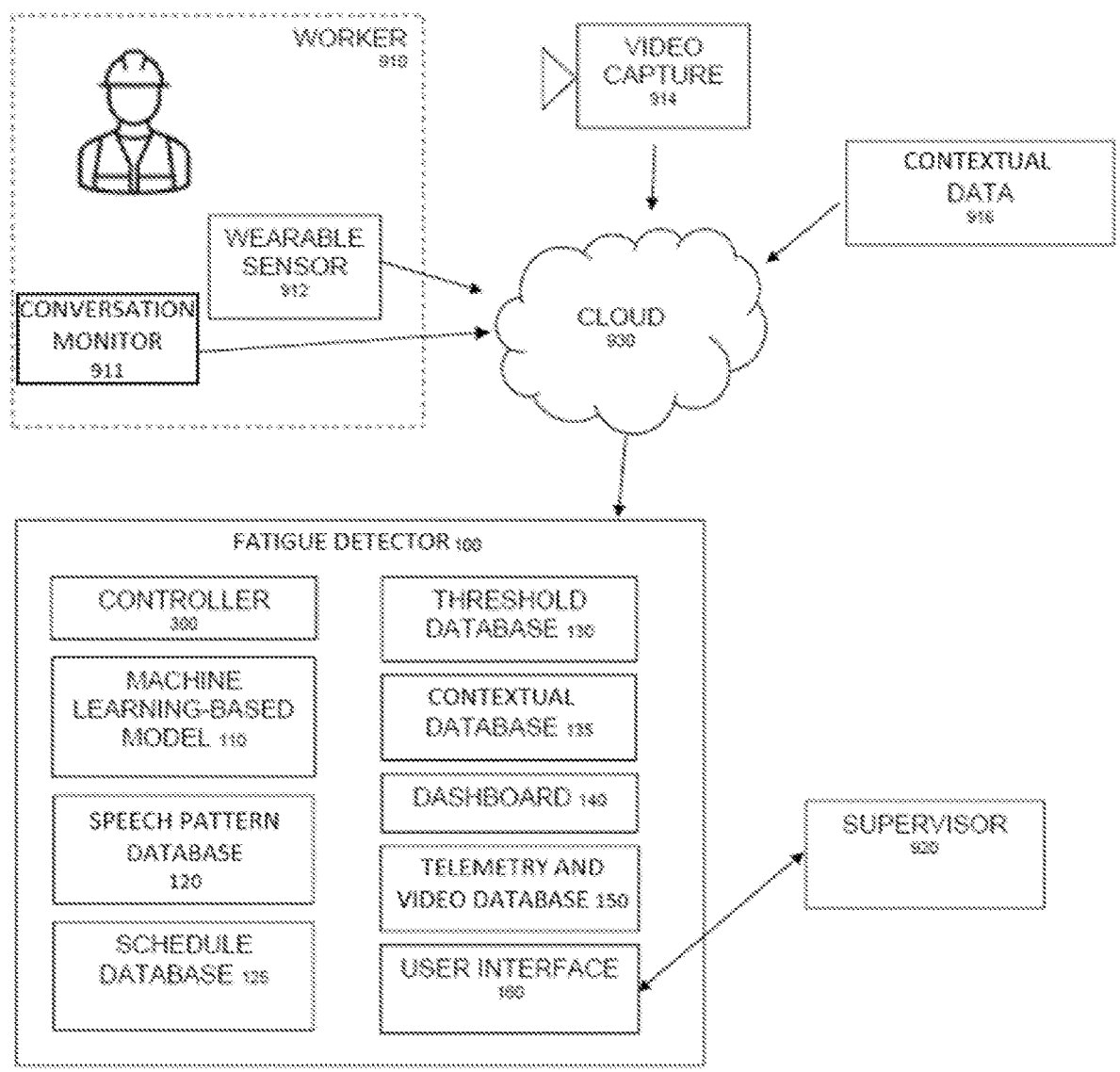
FIG. 2 depicts an exemplary system infrastructure for a fatigue detector for real time fatigue assessment of a worker, according to one or more additional embodiments.

FIG. 2 depicts an exemplary system infrastructure for a system for real time fatigue assessment of a worker, according to one or more embodiments that include additional elements for capturing data useful for determining a fatigue condition of worker 910. Although fatigue detector 100 is described above with reference to FIG. 1 as including databases 120 and 135 for storing speech pattern data from conversation monitor 911 and contextual data system 916, the disclosure is not limited thereto. For example, the fatigue detector 100 may also incorporate data received from a wearable sensor 912 and a video capture system 914, as shown in FIG. 2.

Wearable sensor 912 may be one or more of a wristband, headband, or electrophysiological monitoring sensor, for example, for collection of biometric telemetry data of worker 910 such as heartrate or temperature, for example. Wearable sensor 912 may periodically or continuously collect user biometric telemetry data, and may send the collected user biometric telemetry data to cloud 930 periodically or continuously. Video capture system 914 may periodically or continuously collect video data of worker 910 performing a task in a surrounding environment, and may send the collected video data to cloud 930 periodically or continuously.

Conversation monitor 911, wearable sensor 912, and video capture system 914 may be provided as a single sensor that is either wearable or remote, or both wearable and remote, or as more than two sensors in any combination of wearable and/or remote. For example, conversation monitor 911, wearable sensor 912, and video capture system 914 may be provided as six wristbands, five pressure pads, and four cameras with audio and video recording capability.

In addition to using data from one or more of speech pattern database 120, schedule database 125, threshold database 130, or contextual database 135 to automatically generate a real time fatigue assessment of worker 910, machine learning-based model 110 may further use data from a telemetry and video database 150. Telemetry and video database 120 may store telemetry and video data associated with worker 910 from wearable sensor 912 and video capture system 914, and may store telemetry and video data associated with other workers from other wearable sensors and video capture systems.

Dashboard 140 may provide a software interface for one or more of speech pattern database 120, schedule database 125, threshold database 130, contextual database 135, or telemetry and video database 150. For example, dashboard 140 may receive alerts from machine learning-based model 110 along with real time fatigue assessment of worker 910. Dashboard 140 may receive the real time fatigue assessment of worker 910 from machine learning-based model 110 and generate alerts based on the received assessment.

User interface 160 may include a touchscreen display, for example, to provide information to a user from dashboard 140 and receive information from a user to dashboard 140. For example, supervisor 920 may review alerts generated for dashboard 140 and displayed on user interface 160, or may review and/or update worker schedule information in schedule database 125 using user interface 160 to interact with schedule database 125 through dashboard 140.

Fatigue detector 100 may receive data from conversation monitor 911, wearable sensor 912, video capture system 914, and contextual data system 916, and determine a condition of worker 910 by analyzing the received data using a fatigue algorithm, such as a machine learning algorithm trained on one or more of speech pattern database 120, threshold database 130, contextual database 135, or telemetry and video database 150, for example.

For example, speech pattern database 120 may receive speech pattern data from conversation monitor 911 and telemetry and video database 150 may receive telemetry and video data from wearable sensor 912 and video capture system 914. Machine learning-based model 110 may determine a potential fatigue condition from the speech pattern data when a pitch of the speech and/or a words per minute calculation is below a threshold level, as defined in threshold database 130, for worker 910. Alternatively or in parallel, machine learning-based model 110 may determine a potential fatigue condition from the telemetry data when the heartbeat and/or body temperature of the worker 910 is below a threshold level, as defined in threshold database 130, for worker 910. Consequently, fatigue detector 100 may provide an alert to one or more of worker 910 or supervisor 920 indicating that worker 910 may be experiencing the onset of fatigue and that there should be intervention or mitigation.

In the example of the worker 910 being an operator for mining machinery discussed above, speech pattern database 120 may include speech pattern data from conversation monitor 911 recording the conversation of worker 910, and telemetry and video database 150 may include telemetry and video data from wearable sensor 912 and video capture system 914 monitoring and recording the worker 910. Machine learning-based model 110 may determine the fatigue condition from the data that a pitch of the operator's speech is below a threshold level, as defined in threshold database 130, for the operator, and/or that the heartbeat or amount of movement of worker 910 is below a threshold level, as defined in the threshold database 130. Consequently, fatigue detector 100 may provide an alert to the worker 910 and to a supervisor 920 indicating that the operator may be experiencing the onset of fatigue or may already be in a fatigue condition.

The alert may be one or more of a text message, audio alert, haptic feedback, or visual alert, for example. A visual alert may use different colors such as green, yellow, and red, for example, that correlate respectively with different levels of criticality, such as worker 910 is in a safe condition, worker 910 may be approaching an unsafe fatigue condition, and worker 910 is fatigued and needs immediate attention or relief, for example.

Fatigue detector 100 may receive data from conversation monitor 911, wearable sensor 912, and/or video capture system 914 and, based on data from schedule database 125, determine a task condition and task complexity of worker 910 by analyzing the received data using a task complexity algorithm, such as a machine learning algorithm trained on one or more of speech pattern database 120, telemetry and video database 150, schedule database 125, threshold database 130, or contextual database 135, for example. The task complexity algorithm determines the criticality to safety of a worker 910 performing the task without experiencing a fatigue condition. While worker fatigue is always preferred to be avoided, tasks that require greater complexity or have greater safety concerns are given thresholds that are more critical than relatively easier and safer tasks.

Fatigue detector 100 may receive data from conversation monitor 911, wearable sensor 912, and/or video capture system 914 and, based on data from schedule database 125, determine a mitigation suggestion. Based on the complexity and duration of upcoming tasks, the mitigation suggestion may be a break for the worker 910 or an alternate assignment for worker 910, with the mitigation suggestion being reported to supervisor 920 via dashboard 140. The mitigation suggest may be based on, for example, the nature of the task the worker 910 is engaged in, e.g., the complexity and duration of the task, the last time worker 910 received a break and the duration of the break, the individual capabilities of the worker 910, e.g. the skillset and physical fitness of worker 910, among other factors, the history of the worker 910, e.g. the tendency or lack thereof of the worker 910 to experience fatigue during work tasks or otherwise experience on-the-job accidents, and upcoming priority of tasks, among other considerations.

The machine learning algorithm that may be useful and effective for the analysis is a neural network, which is a type of supervised machine learning. However, other machine learning techniques and frameworks may be used to perform the methods contemplated by the present disclosure. For example, the systems and methods may be realized using other types of supervised machine learning, such as regression problems or random forest, for example, using unsupervised machine learning such as cluster algorithms or principal component analysis, for example, and/or using reinforcement learning. The algorithm may alternatively or additionally be rule-based.

Supervised machine learning may be useful when fatigue detector 100 is certified, and the machine learning algorithm may be certified and closed so that no further updates are applied. However, the disclosure is not limited thereto, and the machine learning algorithm may be trained in a supervised or unsupervised manner with the databases on a periodic or ongoing basis.

Figure 3:
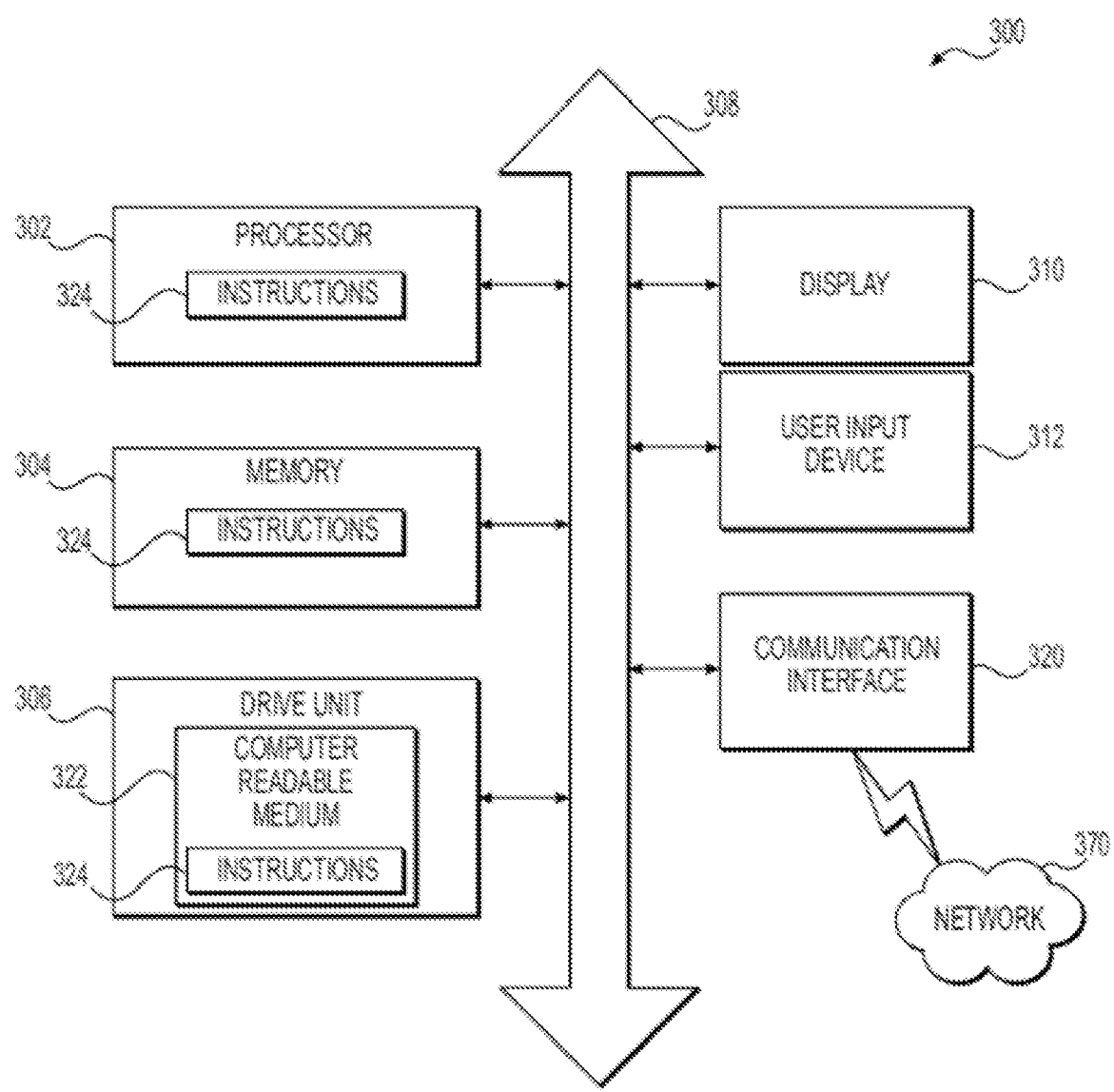
FIG. 3 depicts an implementation of a computer system that may execute techniques presented herein, according to one or more embodiments.

FIG. 3 depicts an implementation of a controller 300 that may execute techniques presented herein, according to one or more embodiments.

The controller 300 may include a set of instructions that can be executed to cause the controller 300 to perform any one or more of the methods or computer based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
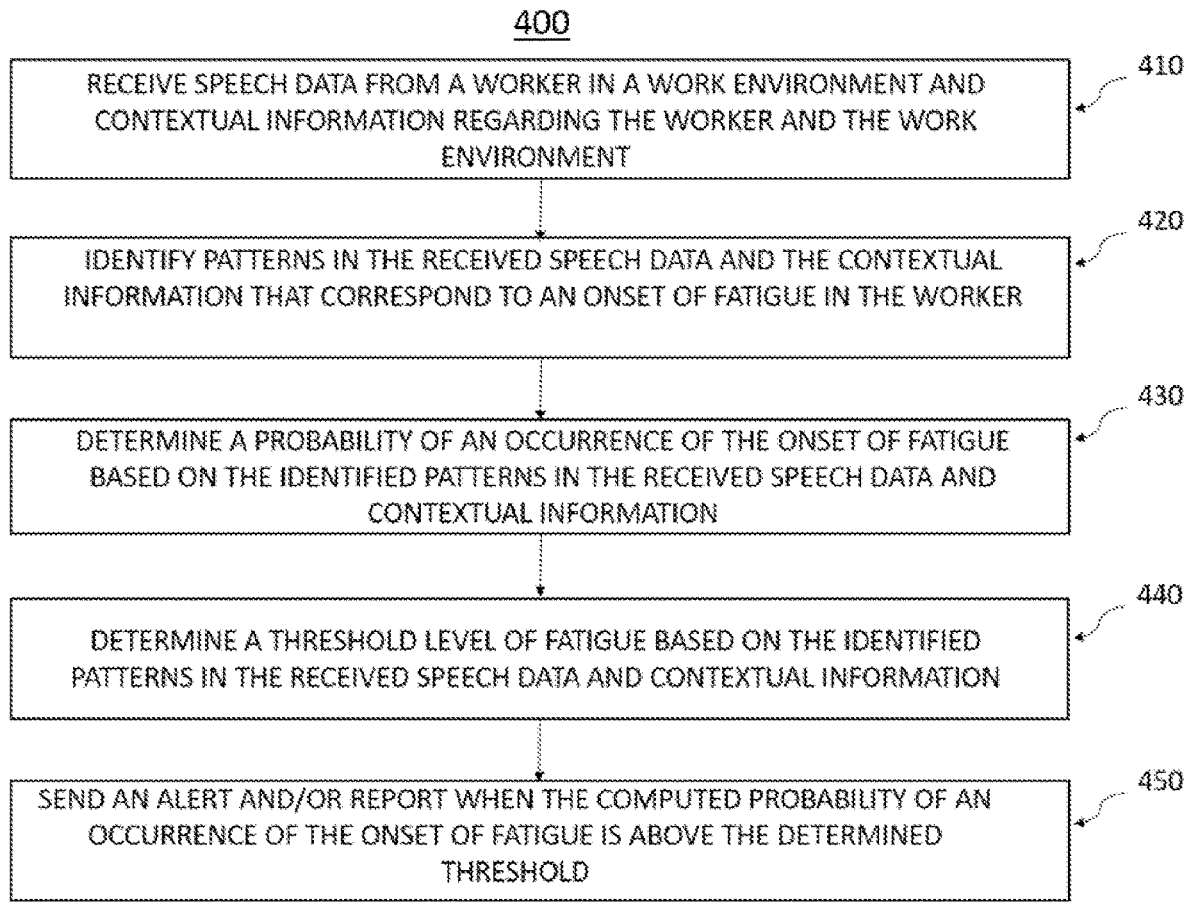
FIG. 4 depicts a flowchart of a method for providing a real-time assessment of worker fatigue using a learning-based model, according to one or more embodiments.

FIG. 4 depicts a flowchart of a method for providing a real-time assessment of worker fatigue using a learning-based model, according to one or more embodiments.

As shown in FIG. 4, method 400 for providing a real-time assessment of worker 910 fatigue may include performing, by controller 300, various operations. The operations may include receiving speech data from a worker 910 in a work environment and contextual information regarding the worker 910 and the work environment (operation 410). Speech data may include any combination of the pitch of the speech of the worker 910, a calculated words per minute, a value indicating the number of yawns of the worker 910, the elapsed time between words or the elapsed time between a prompt or statement from a co-worker and the response of the worker 910, or other parameters. The speech data is obtained via conversation monitor 911 that may be one or more of a microphone, a telephone, a video recording device with audio input, or a computer-based voice over IP application, for example. Speech data is received from conversation monitor 911 and stored in speech pattern database 120 for access by a machine learning-based model 110 in fatigue detector 100. Contextual data is transmitted from contextual data system 916 and may include information regarding the type of worksite (e.g., warehouse, factory, airport tarmac, etc.), the type of task the worker 910 is engaged in, a criticality score for the task, a safety score for the task, and environmental conditions at the worksite, such as temperature, humidity, etc. The criticality score for the task includes values indicating how soon the task needs to be completed, economic considerations for the task, how many other tasks will be delayed if the task is not completed, etc. The safety score for the task includes values indicating the risk to safety if a worker 910 performing the task is not capable and alert. A higher score in either category increases the requirement for a worker 910 to not be experiencing signs of fatigue when performing the task. These scores and environmental factors are stored in contextual database 135. Contextual information may also include access to a worksite schedule to input data into schedule database 125. The contextual information is gathered by a connected warehouse system using the edge and cloud devices described in detail above, including connected sensors.

Speech data and contextual data may be transmitted to and received by fatigue detector 100 via any desired modality, such as wired connection, wireless connection, e.g., via near field communication, Bluetooth, Wi-Fi, and the like. Operation 410 may also comprise formatting the received data or modifying the received data before input into the database 120. The step of inputting the received data into the database can be performed automatically by a server in fatigue detector 100, using an automatic data loading module, and/or any other automatic data loading techniques known in the art.

At operation 420, patterns are identified in the received speech data and contextual information that correspond to an onset of fatigue. The speech data includes information such as pitch, words per minute, number of yawns, and elapsed time between responses from worker 910. Patterns are parsed out that tend to indicate a fatigue condition, such as lower pitch, lower words per minute, higher number of yawns, and longer elapsed time between responses. The contextual information may also include information that may tend toward fatigue, such as an indication of a repetitive task or a higher temperature at the worksite, for example.

In operation 430, the patterns are inputted to a trained machine learning-based model 110 to determine a probability that worker 910 is experiencing the onset of fatigue. The machine learning-based model is trained on speech pattern and contextual information of worker 910 in a variety of physical and mental states and in a variety of contextual environments, as described above such as varying worksites and temperature conditions, to arrive at a probability that the worker 910 is fatigued in real-time based on the real-time speech patterns identified and contextual information.

At operation 440, a threshold score is determined using the machine learning based model 110 that determines a threshold level of fatigue that requires attention and/or mitigation. This threshold level may be based on, for example, the criticality of the task the worker 910 is engaged in, the safety score of the task, etc. and details about the worker 910 such as the worker's history and upcoming tasks. This determination results in the threshold level of fatigue probability that would require attention and/or mitigation and will vary from task to task and worker to worker.

At operation 450, the real-time probability of an occurrence of fatigue in worker 910 determined in operation 430 is compared to the threshold determined in operation 440, and, if the computed probability of fatigue is greater than the threshold probability, an alert and/or report is sent via dashboard 140 and user interface 160 to a supervisor 920 and alternatively to worker 910 as well to indicate that worker 910 is fatigued and that action should be taken.

As discussed above, based on the complexity and duration of upcoming tasks, the mitigation suggestion may be a break for the worker 910 or an alternate assignment for worker 910, with the mitigation suggestion being reported to supervisor 920 via dashboard 140. The mitigation suggest may be based on, for example, the nature of the task the worker 910 is engaged in, e.g., the complexity and duration of the task, the last time worker 910 received a break and the duration of the break, the individual capabilities of the worker 910, e.g. the skillset and physical fitness of worker 910, among other factors, the history of the worker 910, e.g. the tendency or lack thereof of the worker 910 to experience fatigue during work tasks or otherwise experience on-the-job accidents, and upcoming priority of tasks, among other considerations.

Figure 5:
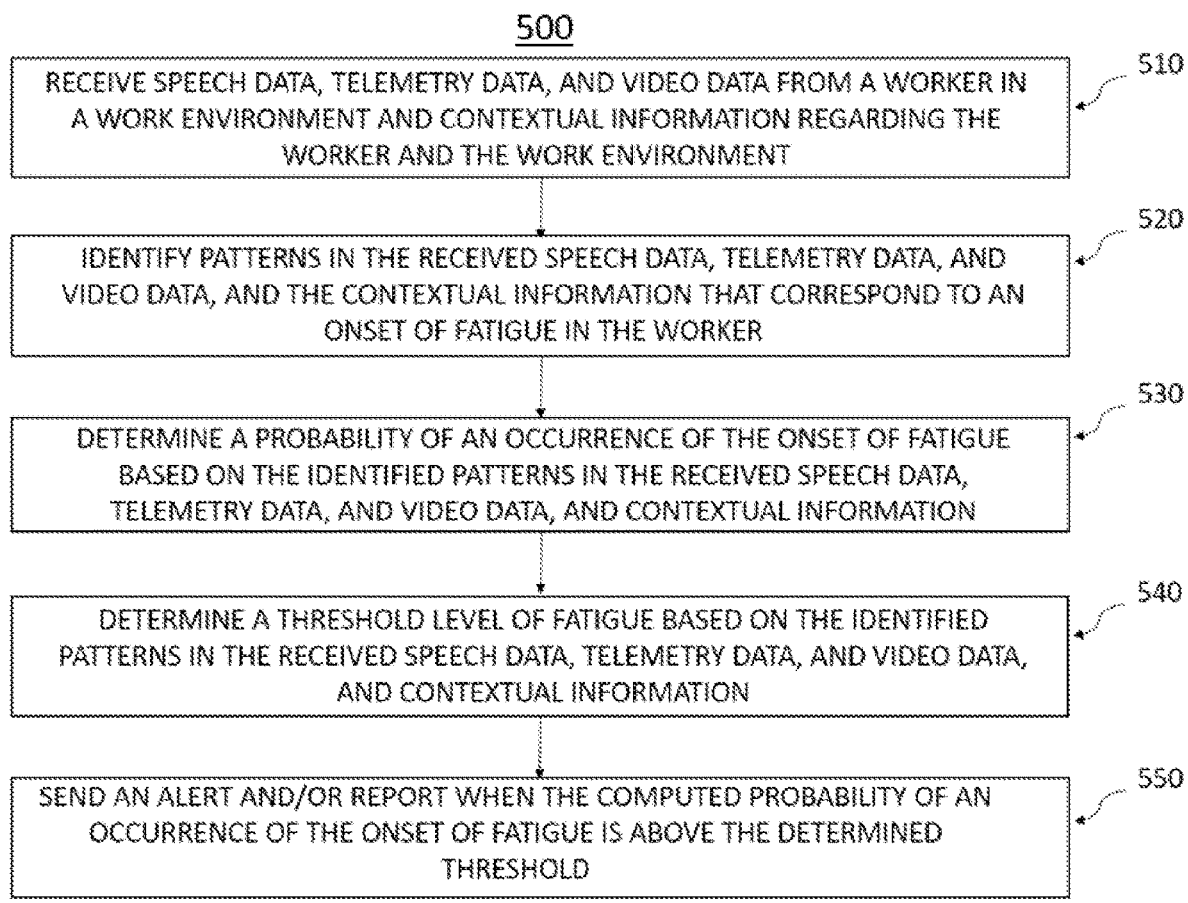
FIG. 5 depicts a flowchart of a method for providing a real-time assessment of worker fatigue using a learning-based model, according to one or more embodiments.

FIG. 5 depicts a flowchart of a method for providing a real-time assessment of worker fatigue using a learning-based model, according to one or more embodiments.

As shown in FIG. 5, method 500 for providing a real-time assessment of worker 910 fatigue may include performing, by controller 300, various operations. The operations may include receiving speech data from a worker 910, telemetry data from a wearable sensor 912, and video data from a video capture system 914 in a work environment, in addition to contextual information regarding the worker 910 and the work environment (operation 510). As discussed above with reference to FIG. 4, speech data may include any combination of the pitch of the speech of the worker 910, a calculated words per minute, a value indicating the number of yawns of the worker 910, the elapsed time between words or the elapsed time between a prompt or statement from a co-worker and the response of the worker 910, or other parameters. The speech data is obtained via conversation monitor 911 that may be one or more of a microphone, a telephone, a video recording device with audio input, or a computer-based voice over IP application, for example. Speech data is received from conversation monitor 911 and stored in speech pattern database 120 for access by a machine learning-based model 110 in fatigue detector 100. Wearable sensor 912 may be one or more of a wristband, headband, or electrophysiological monitoring sensor, for example, for collection of biometric telemetry data of worker 910 such as heartrate or temperature, for example. Wearable sensor 912 may periodically or continuously collect user biometric telemetry data, and may send the collected user biometric telemetry data to cloud 930 periodically or continuously. Video capture system 914 may periodically or continuously collect video data of worker 910 performing a task in a surrounding environment, and may send the collected video data to cloud 930 periodically or continuously.

As discussed with reference to FIG. 4 above, contextual data is transmitted from contextual data system 916 and may include information regarding the type of worksite (e.g., warehouse, factory, airport tarmac, etc.), the type of task the worker 910 is engaged in, a criticality score for the task, a safety score for the task, and environmental conditions at the worksite, such as temperature, humidity, etc. The criticality score for the task includes values indicating how soon the task needs to be completed, economic considerations for the task, how many other tasks will be delayed if the task is not completed, etc. The safety score for the task includes values indicating the risk to safety if a worker 910 performing the task is not capable and alert. A higher score in either category increases the requirement for a worker 910 to not be experiencing signs of fatigue when performing the task. These scores and environmental factors are stored in contextual database 135. Contextual information may also include access to a worksite schedule to input data into schedule database 125. The contextual information is gathered by a connected warehouse system using the edge and cloud devices described in detail above, including connected sensors.

Speech data, telemetry data, video data, and contextual data may be transmitted to and received by cloud 930 via any desired modality, such as wired connection, wireless connection, e.g., via near field communication, Bluetooth, Wi-Fi, and the like. Operation 410 may also comprise formatting the received data or modifying the received data before input into the database 120. The step of inputting the received data into the database can be performed automatically by a server in fatigue detector 100, using an automatic data loading module, and/or any other automatic data loading techniques known in the art.

At operation 420, patterns are identified in the received speech data, telemetry data, video data, and contextual information that correspond to an onset of fatigue. The speech data includes information such as pitch, words per minute, number of yawns, and elapsed time between responses from worker 910. Patterns are parsed out that tend to indicate a fatigue condition, such as lower pitch, lower words per minute, higher number of yawns, and longer elapsed time between responses. The contextual information may also include information that may tend toward fatigue, such as an indication of a repetitive task or a higher temperature at the worksite, for example.

In operation 430, the patterns are inputted to a trained machine learning-based model 110 to determine a probability that worker 910 is experiencing the onset of fatigue. The machine learning-based model is trained on speech pattern, telemetry data, video data, and contextual information of worker 910 in a variety of physical and mental states and in a variety of contextual environments, as described above such as varying worksites and temperature conditions, to arrive at a probability that the worker 910 is fatigued in real-time based on the real-time speech patterns, telemetry data, video data, and contextual information.

At operation 440, a threshold score is determined using the machine learning based model 110 that determines a threshold level of fatigue that requires attention and/or mitigation. This threshold level may be based on, for example, the criticality of the task the worker 910 is engaged in, the safety score of the task, etc. and details about the worker 910 such as the worker's history and upcoming tasks. This determination results in the threshold level of fatigue probability that would require attention and/or mitigation and will vary from task to task and worker to worker.

At operation 450, the real-time probability of an occurrence of fatigue in worker 910 determined in operation 430 is compared to the threshold determined in operation 440, and, if the computed probability of fatigue is greater than the threshold probability, an alert and/or report is sent via dashboard 140 and user interface 160 to a supervisor 920 and alternatively to worker 910 as well to indicate that worker 910 is fatigued and that action should be taken.

As discussed above, based on the complexity and duration of upcoming tasks, the mitigation suggestion may be a break for the worker 910 or an alternate assignment for worker 910, with the mitigation suggestion being reported to supervisor 920 via dashboard 140. The mitigation suggest may be based on, for example, the nature of the task the worker 910 is engaged in, e.g., the complexity and duration of the task, the last time worker 910 received a break and the duration of the break, the individual capabilities of the worker 910, e.g. the skillset and physical fitness of worker 910, among other factors, the history of the worker 910, e.g. the tendency or lack thereof of the worker 910 to experience fatigue during work tasks or otherwise experience on-the-job accidents, and upcoming priority of tasks, among other considerations.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for providing real-time assessment of worker fatigue using a learning-based model, the method comprising:
    receiving, by a processor, speech data from a worker in a work environment and contextual information regarding the worker and the work environment;
    identifying, by the processor, patterns in the received speech data and the contextual information that correspond to an onset of fatigue in the worker;
    determining, by the processor, a probability of an occurrence of the onset of fatigue based on the identified patterns in the received speech data and contextual information;
    determining, by the processor and using the contextual information, that the work environment is associated with a first criticality level of a set of criticality levels;
    determining, by the processors, a fatigue related threshold in response to determining that the work environment is associated with the first criticality level of the set of criticality levels; and
    sending, by the processor, an alert and/or a report to a real-time dashboard of a display when the probability of the occurrence of the onset of fatigue is above the fatigue related threshold.

2. The method of claim 1, wherein the step of identifying patterns in the received speech data and the contextual information that correspond to the onset of fatigue in the worker comprises utilizing at least one machine learning model.

3. The method of claim 2, wherein the at least one machine learning model includes a fatigue learning module that is trained on speech data collected from the worker during a variety of mental and physical conditions.

4. The method of claim 1, wherein
    the receiving step further includes receiving, by a processor, telemetry and video data from a worker in a work environment via a wearable sensor and a video capture system;
    the identifying step further includes identifying, by the processor, patterns in the received telemetry and video data that correspond to an onset of fatigue in the worker; and
    the determining step further includes determining, by the processor, a probability of an occurrence of the onset of fatigue based on the identified patterns in the received telemetry and video data.

5. The method of claim 4, wherein the step of identifying patterns in the received telemetry and video data that correspond to the onset of fatigue in the worker comprises utilizing at least one machine learning model.

6. The method of claim 5, wherein the at least one machine learning model includes a fatigue learning module that is trained on:
    speech data collected from the worker during a variety of mental and physical conditions;
    telemetry data collected from the worker during the variety of mental and physical conditions; and
    video data collected from the worker during the variety of mental and physical conditions.

7. The method of claim 1, wherein the step of sending the alert and/or the report includes sending a mitigation suggestion to the real-time dashboard of the display.

8. A computer system for providing real-time assessment of worker fatigue using a learning-based model, the computer system comprising:
    at least one memory having processor-readable instructions stored therein; and
    at least one processor configured to access the memory and execute the processor-readable instructions, which when executed by the processor configured the processor to perform a plurality of functions, including functions for:
    receiving, by a processor, speech data from a worker in a work environment and contextual information regarding the worker and the work environment;
    identifying, by the processor, patterns in the received speech data and the contextual information that correspond to an onset of fatigue in the worker;
    determining, by the processor, a probability of an occurrence of the onset of fatigue based on the identified patterns in the received speech data and contextual information;
    determining, by the processor and using the contextual information, that the work environment is associated with a first criticality level of a set of criticality levels;
    determining, by the processors, a fatigue related threshold in response to determining that the work environment is associated with the first criticality level of the set of criticality levels; and
    sending, by the processor, an alert and/or a report to a real-time dashboard of a display when the probability of the occurrence of the onset of fatigue is above the fatigue related threshold.

9. The system of claim 8, wherein the step of identifying patterns in the received speech data and the contextual information that correspond to the onset of fatigue in the worker comprises utilizing at least one machine learning model.

10. The system of claim 9, wherein the at least one machine learning model includes a fatigue learning module that is trained on speech data collected from the worker during a variety of mental and physical conditions.

11. The system of claim 8, wherein
    the receiving step further includes receiving, by a processor, telemetry and video data from a worker in a work environment via a wearable sensor and a video capture system;
    the identifying step further includes identifying, by the processor, patterns in the received telemetry and video data that correspond to an onset of fatigue in the worker; and the determining step further includes determining, by the processor, a probability of an occurrence of the onset of fatigue based on the identified patterns in the received telemetry and video data.

12. The system of claim 11, wherein the step of identifying patterns in the received telemetry and video data that correspond to the onset of fatigue in the worker comprises utilizing at least one machine learning model.

13. The system of claim 12, wherein the at least one machine learning model includes a fatigue learning module that is trained on:
   speech data collected from the worker during a variety of mental and physical conditions;
   telemetry data collected from the worker during the variety of mental and physical conditions; and
   video data collected from the worker during the variety of mental and physical conditions.

14. The system of claim 8, wherein the step of sending an alert and/or a report includes sending a mitigation suggestion to the real-time dashboard of the display.

15. A non-transitory computer-readable medium containing instructions for providing real-time assessment of worker fatigue using a learning-based model, the non-transitory computer-readable medium storing instructions that, when executed by at least one processor, configure the at least one processor to perform:
   receiving, by a processor, speech data from a worker in a work environment and contextual information regarding the worker and the work environment;
   identifying, by the processor, patterns in the received speech data and the contextual information that correspond to an onset of fatigue in the worker;
   determining, by the processor, a probability of an occurrence of the onset of fatigue based on the identified patterns in the received speech data and contextual information;
   determining, by the processor and using the contextual information, that the work environment is associated with a first criticality level of a set of criticality levels;
   determining, by the processors, a fatigue related threshold in response to determining that the work environment is associated with the first criticality level of the set of criticality levels; and
   sending, by the processor, an alert and/or a report to a real-time dashboard of a display when the probability of the occurrence of the onset of fatigue is above the fatigue related threshold.

16. The non-transitory computer-readable medium of claim 15, wherein the step of identifying patterns in the received speech data and the contextual information that correspond to the onset of fatigue in the worker comprises utilizing at least one machine learning model.

17. The non-transitory computer-readable medium of claim 16, wherein the at least one machine learning model includes a fatigue learning module that is trained on speech data collected from the worker during a variety of mental and physical conditions.

18. The non-transitory computer-readable medium of claim 15, wherein
   the receiving step further includes receiving, by a processor, telemetry and video data from a worker in a work environment via a wearable sensor and a video capture system;
   the identifying step further includes identifying, by the processor, patterns in the received telemetry and video data that correspond to an onset of fatigue in the worker; and
   the determining step further includes determining, by the processor, a probability of an occurrence of the onset of fatigue based on the identified patterns in the received telemetry and video data.

19. The non-transitory computer-readable medium of claim 18, wherein the step of identifying patterns in the received telemetry and video data that correspond to the onset of fatigue in the worker comprises utilizing at least one machine learning model.

20. The non-transitory computer-readable medium of claim 19, wherein the at least one machine learning model includes a fatigue learning module that is trained on:
   speech data collected from the worker during a variety of mental and physical conditions;
   telemetry data collected from the worker during the variety of mental and physical conditions; and
   video data collected from the worker during the variety of mental and physical conditions.

* * * * *